(12) United States Patent
Chowdhury et al.

(10) Patent No.: US 8,099,077 B2
(45) Date of Patent: Jan. 17, 2012

(54) CUSTOMER IDENTIFICATION AND AUTHENTICATION PROCEDURE FOR ONLINE INTERNET PAYMENTS USING MOBILE PHONE

(75) Inventors: Amor Chowdhury, Gornja Radgona (SI); Gregor Breznik, Ljubljana (SI); Klemen Verdnik, Velenje (SI); Bor Prihavec, Ig (SI)

(73) Assignee: Ultra Proizvodnja Elektronskih Naprav D.O.O., Zagorje (SI)

( * ) Notice: Subject to any disclaimer, the term of this patent is extended or adjusted under 35 U.S.C. 154(b) by 358 days.

(21) Appl. No.: 12/373,040

(22) PCT Filed: Jul. 11, 2006

(86) PCT No.: PCT/IB2006/001904
§ 371 (c)(1),
(2), (4) Date: Jul. 27, 2009

(87) PCT Pub. No.: WO2008/007162
PCT Pub. Date: Jan. 17, 2008

(65) Prior Publication Data
US 2010/0130164 A1    May 27, 2010

(51) Int. Cl.
*H04W 88/02* (2009.01)

(52) U.S. Cl. ....................................... 455/406

(58) Field of Classification Search .................. 455/434, 455/406.41, 63.1, 41.2; 705/26.35, 64, 13, 705/26.1, 52, 75; 340/5.82; 375/316; 369/47.19
See application file for complete search history.

(56) References Cited

U.S. PATENT DOCUMENTS

| 7,698,398 B1 * | 4/2010 | Lai .............................. 709/223 |
| 2003/0130877 A1 * | 7/2003 | Farnes et al. ..................... 705/7 |
| 2007/0079120 A1 * | 4/2007 | Bade et al. ..................... 713/166 |
| 2008/0133381 A1 * | 6/2008 | O'Brien et al. ................. 705/27 |
| 2010/0223200 A1 * | 9/2010 | Balson et al. ............... 705/36 R |

* cited by examiner

*Primary Examiner* — Diane Mizrahi
(74) *Attorney, Agent, or Firm* — McDermott Will & Emery LLP

(57) ABSTRACT

This invention shows a mobile terminal device (3) having a memory unit (3*a*) and an interface device (3*b*) which is releasably connectable to a multiple partner system (7, 9, 15) and capable for a communication therein, wherein said communication is provided by a front-end formed by said mobile terminal device (3) in combination with a personal computer device (2) and a back-end formed by a partner of said multiple partner system via communication ways, said communication being suitable for performing data transactions with variant security requirements, such that complementary parts of, or parts within a distributed application, running within a multi partner system, are performed dependent on their current security requirements, wherein said communication is used to exchange information by using said communication ways of different and variant characteristics (4, 6, 12, 17, 13) by using different communication channels and different interface standards or protocols.

1 Claim, 9 Drawing Sheets

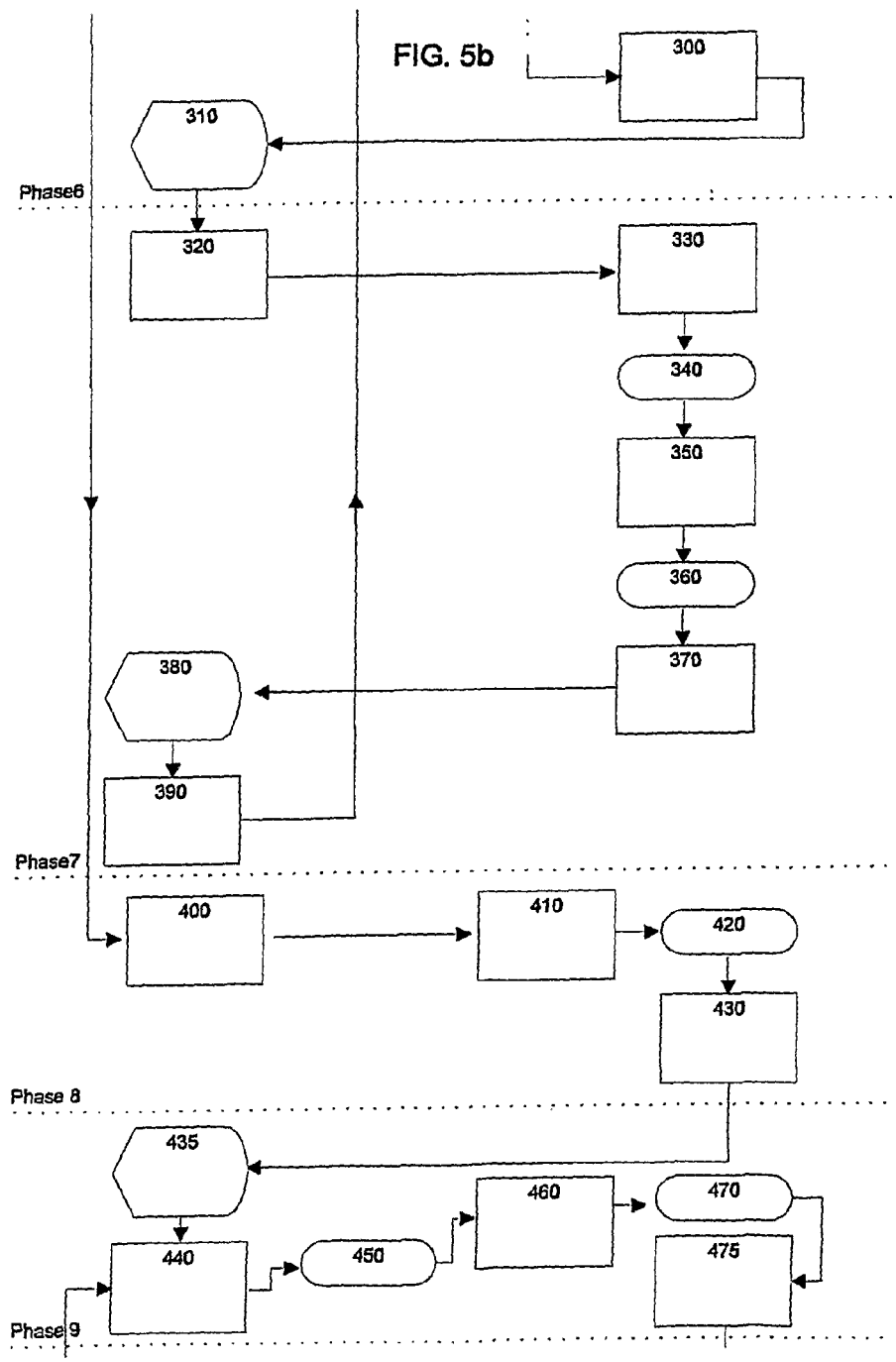

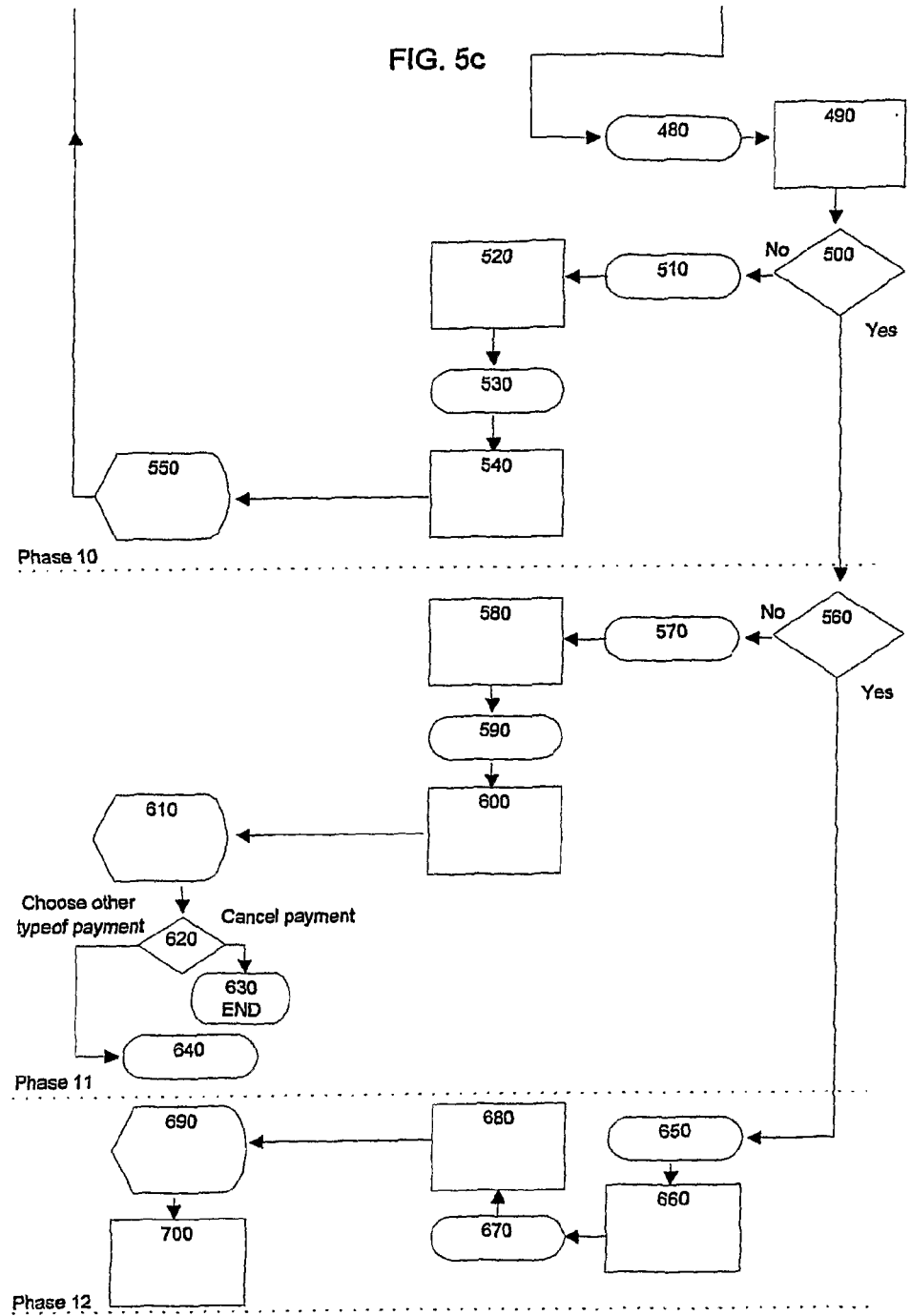

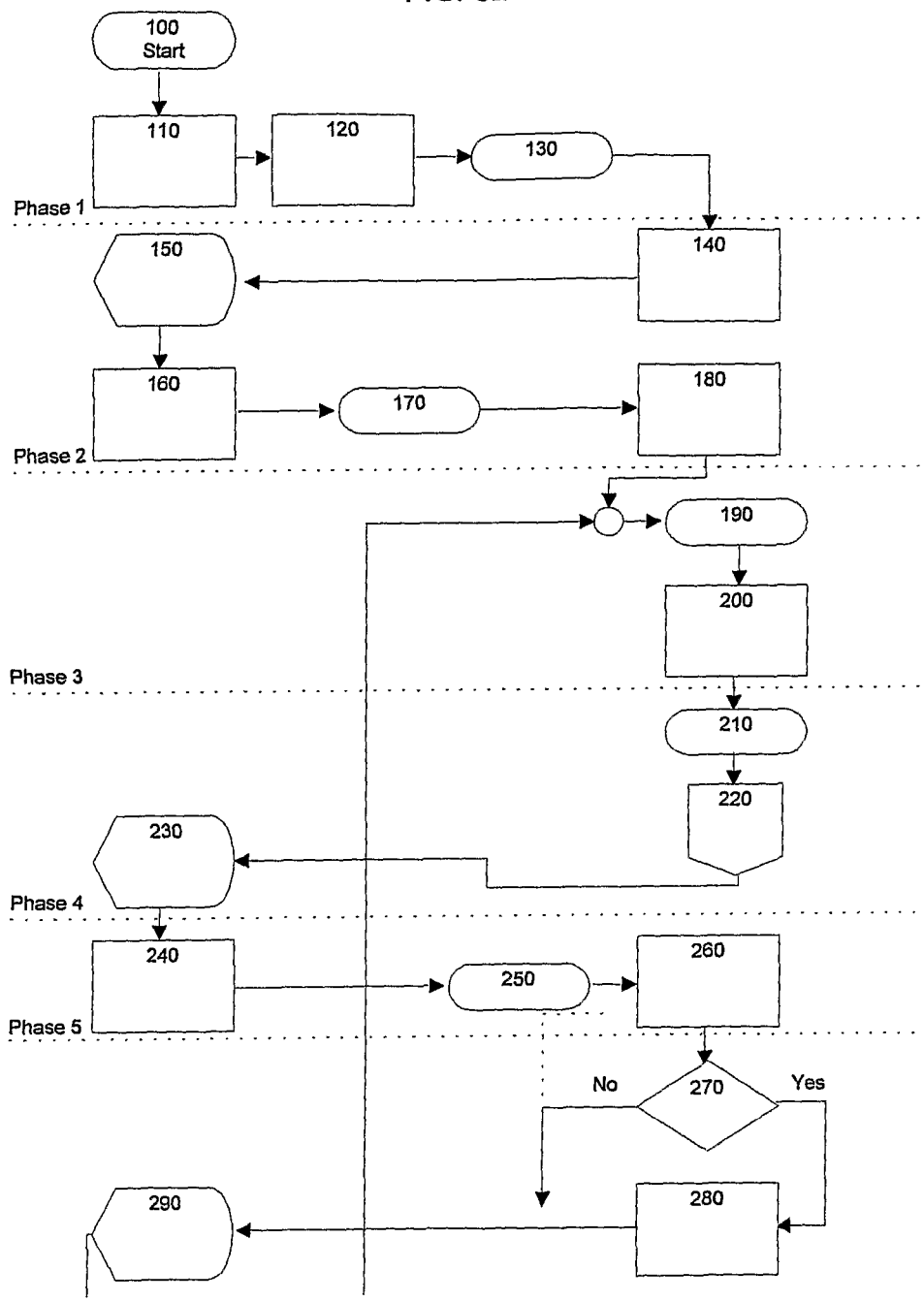

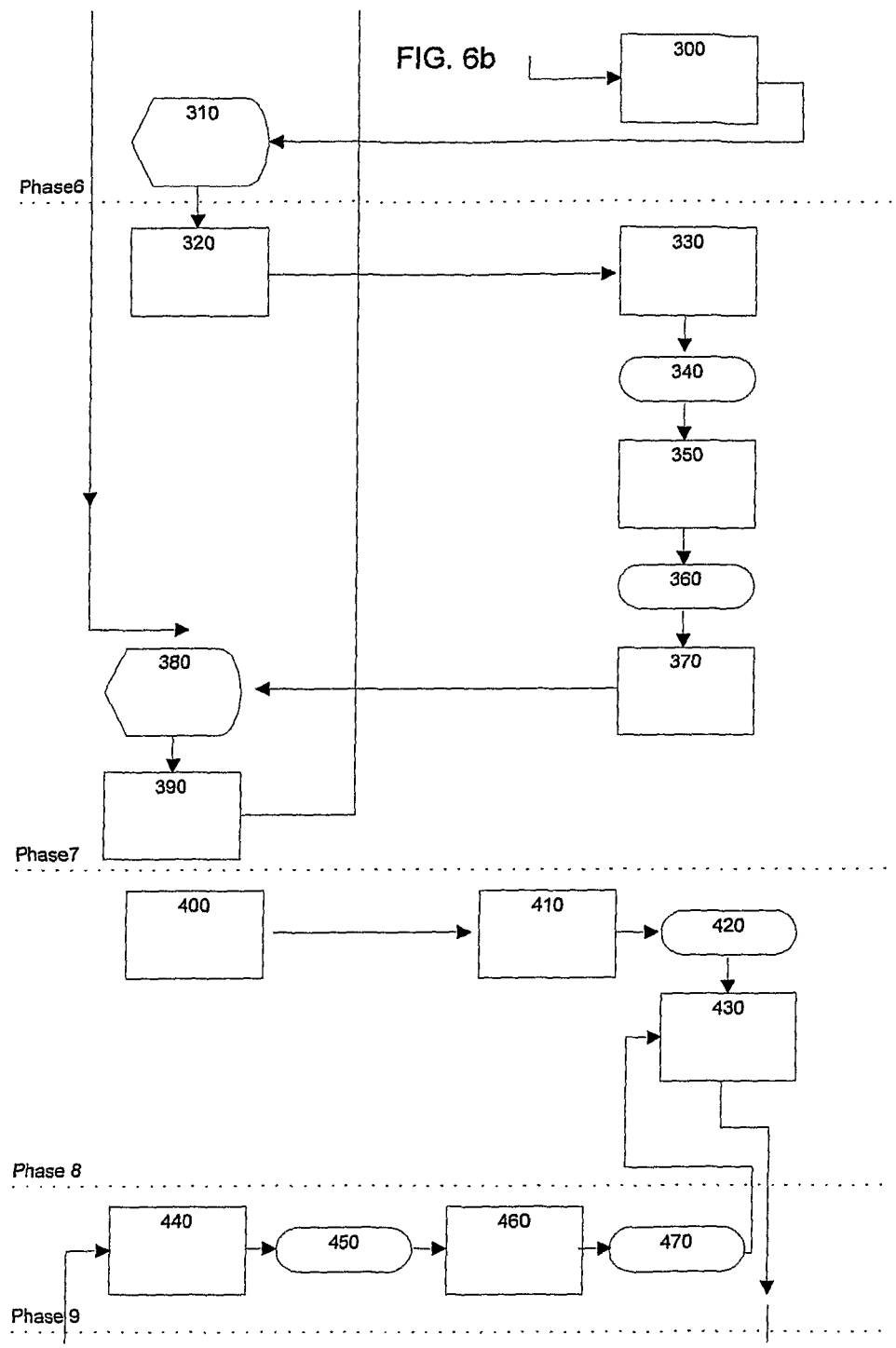

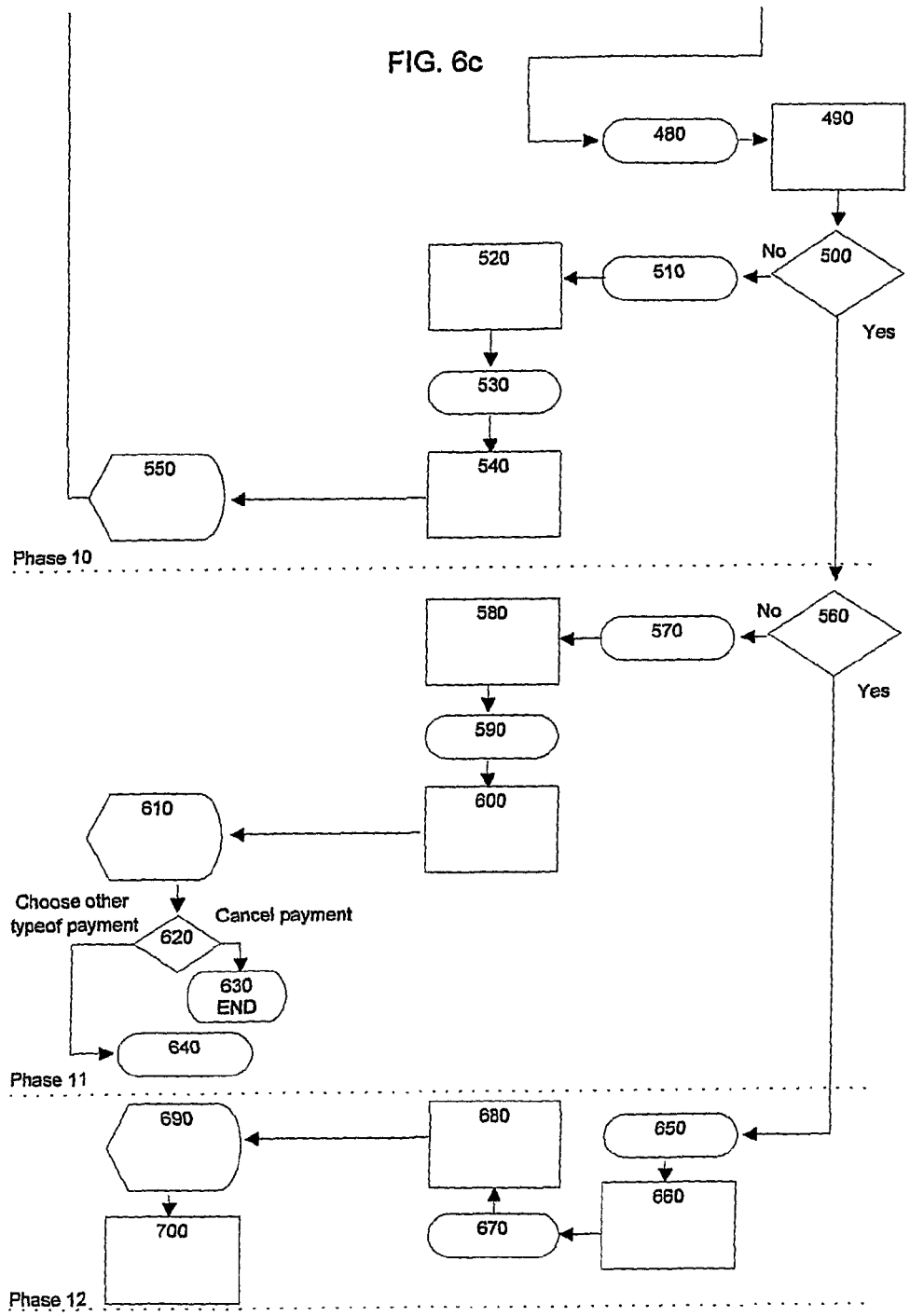

CUSTOMER IDENTIFICATION AND AUTHENTICATION PROCEDURE FOR ONLINE INTERNET PAYMENTS USING MOBILE PHONE

AREA OF THE INVENTION

The present invention generally relates to a system of financial transaction data exchange between an internet point of sale, a mobile terminal device and an authorization and processing center.

BACKGROUND OF THE INVENTION

Mobile telecommunication technology is experiencing unprecedented worldwide success. Never before in history has a high technology achieved market penetration in such a short time. On the other hand, the popularity of the internet continues to grow due to the abundance of information, services, commerce, and entertainment that people enjoy from Internet based resources.

However, in order to have access to much of the most useful information and services—while keeping an acceptable level of security, users must remember an increasing number of usernames, passwords, Personal Identification Numbers (PINs), etc. For services that require added security, like e-commerce, m-commerce, online banking, etc. the use of passwords or PINS as a means of identification and authentication is not strong enough. Stronger identification and authentication means are required.

Today's internet payment systems are using different types of identification and authentication methods. Like for example:
  username and password
  pre-generated secure codes
  certificates
  entering a verification code received via Short Message Services SMS message Some of the payment systems are using the SMS to identify a customer. Payment service sends a verification code to the customer's mobile phone. He enters the code in the web browser, and system identifies him. This kind of methods is not convenient for the customers, because the procedures are difficult, take time, aren't understandable. Beside this the customers might get the feeling that their mobile phone numbers could get exploited.

The present invention proposes an approach that contributes to security-related services of mobile phone networks to the Internet. As already disclosed in WO-0233669, titled "SYSTEM FOR PAYMENT DATA EXCHANGE AND PAYMENT TERMINAL DEVICE USED THEREIN", the present invention concentrates on the security-related services around mobile phones like GSM smart cards more precisely on the Subscriber Identity Module (SIM).

In particular description of a mobile payment scenario is disclosed, where a payment transaction which is carried out on the Internet is made with the combination of mobile phone and internet communications links.

Unlike other types of identification and authentication methods, it's the fastest and the easiest way to identify a customer and enabling him secure internet payment transaction.

According to the invention, a system and a payment procedure is provided.

BRIEF DESCRIPTION OF THE DRAWINGS

Embodiments of the invention will now be described, by way of example, and with reference to the accompanying drawings, in which:

FIG. 5a to 5c is a flow chart diagram, where a PIN is entered after customer identification according to one embodiment of the invention;

FIG. 6a to 6c is a flow chart diagram, where a PIN is entered before customer identification according to one embodiment of the invention;

FIG. 1 illustrates the inventive structure according to one embodiment of the present invention.

Figure 1:
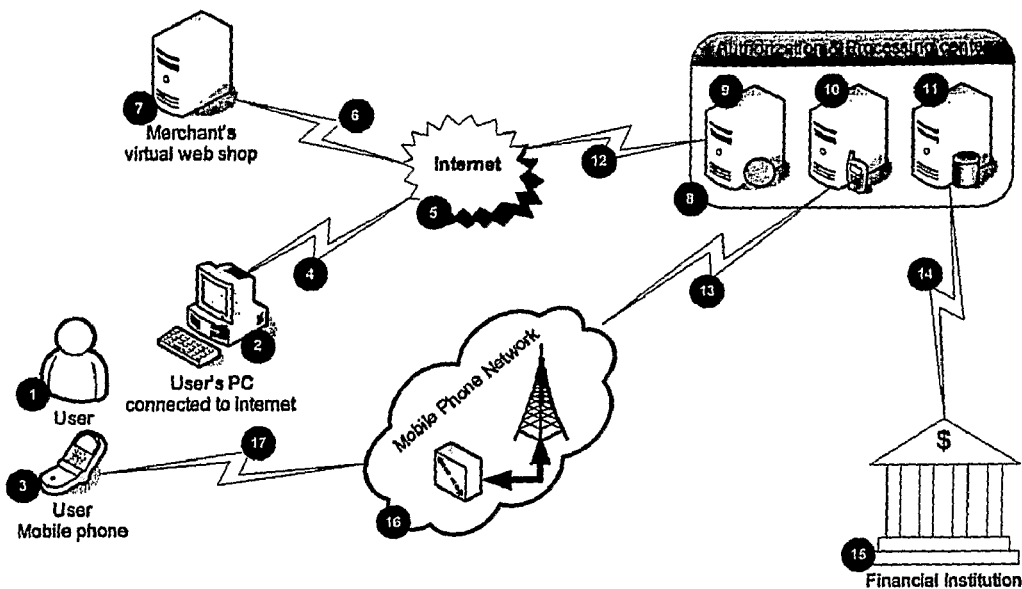
FIG. 1 is a system structure with a WEB interface according to one embodiment of the invention.

A user 1, typically a customer, is positioned in front of a Personal Computer (PC) 2 which, for example, displays an application using a web browser and having a mobile terminal device 3 at hand, which for example has WAP interface.

Said PC 2 is connected via an interface component to the Internet 5 on a connection 4, e.g. a transmission channel. On the other hand, the mobile terminal device 3 is releasably connected by an interface component to a Mobile Phone Network 16 via a connection 17.

The PC 2 of the user 1 and his mobile terminal device 3 form a hybrid communication unit 18.

A virtual web shop 7 of a merchant is connected to said internet 5 by a connection 6. On the other side, an APC (authorization and processing center) 8, having subsystems is also connected to said Internet 5 via a connection 12.

Subsystems of said APC 8 are a Web server 9, a mobile network gateway 10 and a data server 11.

Said Mobile Phone Network 16 is connected to said mobile network gateway 11 of said APC 8 via a connection 13.

Said data server 11 is connected to a financial institution 15 via a separate connection 14.

Said user 1 is registered by the APC 8 and has valid mobile payment instrument (Diners-, Master-, Euro-, Amex-, Visa-Card, etc.) issued from the financial institution 15.

Now, the function according to an embodiment of the present invention is for example as follows: A User 1 is surfing on his PC 2 in the Merchant's virtual shop internet application 7 via the Internet network 5.

Once the User 1 has concluded his shopping of goods, services or both the payment procedure is following.

First step is to choose the payment method in the Merchants virtual shop internet application 7 which is enabling the mobile payment.

Next, the Merchants virtual shop internet application 7 is activating the authorization and processing center Web server application for payment 9.

Further, the Merchant's virtual shop internet application 7 is passing to the APC 8 all necessary payment transactions data like amount, bill reference number, etc.

Next, the web browser displaying to the user in his the APC Web server application for payment 9 gets a transaction ID code which is generated in the APC 8.

After receiving a transaction ID code via web browser on his PC 2, the User has to send this transaction ID code via his Mobile phone 3 to the APC 8, more precisely to the APC mobile network gateway 10. The task of APC mobile network gateway 10 is to get the MSISDN (mobile subscriber ISDN Number), an equipment identifier of the individual mobile phone 9, which is also sent as identification characteristic while the mobile phone 3 is being used and the transaction ID code.

In the next step the APC 8 is informing the User 1 about the successful receiving of the transaction ID code via his Mobile phone 3 or via web browser on User's PC 2 or via both.

Further, internet connections 4, 12 are established as secure connections between Users PC 2 and the APC Web server 9. Secured encrypted communication is enabling to the User 1 a safe selection of payment instrument in the APC Web server application 9 and safe PIN transmission which is attached to the payment instrument to the APC 8.

On a side of APC 8 the data connection to financial institution 14 is activated for the authorization of the payment instrument.

If authorization from a side of the financial institution (issuer) 9 is approved then the final step is a confirmation of the payment transaction to User 1 via his web browser. With this the internet payment transaction is concluded for the User 1.

Afterwards, all necessary data about the transaction are recorded in the APC data server 11 and beside this all necessary data are sent to Merchant web store 7 and to the financial institution data platform 15.

The advantage of using such a hybrid communication arrangement by using a mobile terminal device 3 an a PC 2 lies in several variant possibilities, for example, to use two different communication way, i.e. a dual-way communication, or to use different interface standards, e.g. a web or WAP protocol for executing an application.

Said application, electronic payment, regarded as a whole, is distributed over several participants, of a, for example, four-partner system, wherein each of the partners, the participants, here for example said user, the hybrid communication means formed by mobile terminal device and Personal computer, said virtual shop, said APC and said financial institution, can receive and process incoming information, send and forward outgoing information, suitable for the respective interface standard used on the respective communication way, for example bandwidth or channel optimized.

Each participant of said partner system is provides means, for example, for receiving, forwarding, relaying, processing and filtering messages, including intermediate memory, storage or scheduling strategies with priority as provided by a typical software application.

On the one hand, in a mobile terminal device, there exists an environment with limited or different resources in view of for example, network capabilities, display, memory, processor, storable available energy in connection with achievable operating time and input/output terminals compared to a PC.

Also, the mobile users have typically limited input-/output-capabilities, for example, a little alphanumeric input-block or a little display device, which result because of the outer dimensions of the devices.

Second, the typical usage context of so-called wireless applications running on said mobile terminal device is very different against the one of solid-net-internet applications running on a personal computer.

Third, available network connections, typically over the air, are not only considerably slower, be it in view of atmospheric influences on transmission channels and propagation phenomenons up to aspects of channel loading and signal to noise aspects, but the are also more expensive.

But here, in the field of online payment, most characteristics of a mobile terminal device, for example in view of size compared to a personal computer immediately turn into a big advantage when combined together, for example, by using transmission ways in a cooperative or complementary manner in view of the application requirements.

According to an embodiment of the present invention concerning a payment transaction, on the one hand, a small amount of very important information is to be transmitted with most security, where the mobile terminal is preferably suitable for, and on the other hand, for a large amount information of comparably lower importance is to be transmitted, where a personal computer is advantageous.

Thus, the mobile device is ideally suited for a supplement for a personal computer or even a full-featured powerful stand-alone solution.

In summary, by combining a hybrid communication which fulfils complementary tasks which are specific required within a payment application, said application being formed by running distributedly in a system powered by several participants, an improved online payment method is provided for user identification.

One the one hand, said payment method is innovative for the cooperating partners in the system, because of low overhead regarding the main concern and core competence of the respective partner. The system is easy to maintain and provides a advanced level of security for a comparably moderate cost expenditure.

On the other hand, said method is convenient and simple to operate for the user and does so far not overload the user with parts of the transaction which are of no interest.

Figure 2:
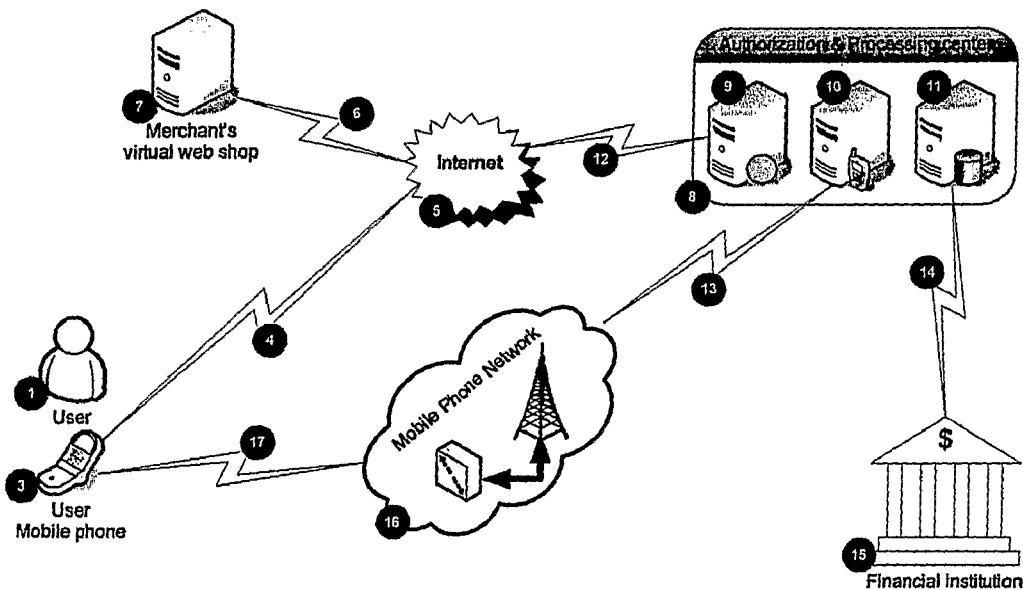
FIG. 2 is a system structure with a WAP interface according to another embodiment of the invention.

FIG. 2 illustrates a modification of FIG. 1 in another embodiment that only said mobile terminal device 3 is present. It has, however, said connection 4 to said internet 5 and said connection 17 to said mobile phone network 16.

Insofar FIG. 2 is a concentrated version to FIG. 1 in that the hybrid communication of FIG. 1 is now performed in one device only, for example by a mobile terminal device, alone, using different interface standards. In a further embodiment, the mobile device offers the same or a comparable functionality like a personal computer, such that, in this case, mobile device and personal computer are or behave equal.

Figure 3:
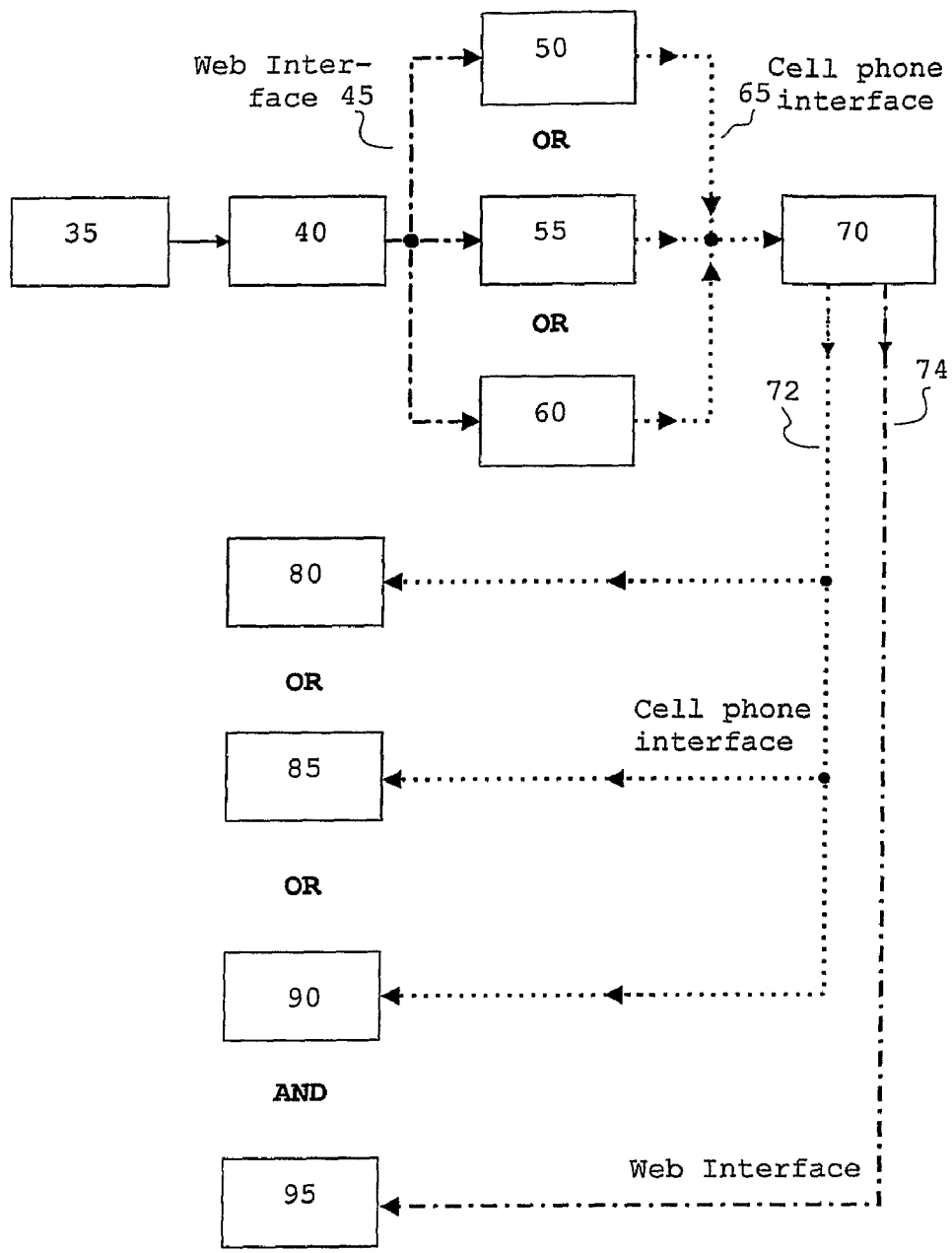
FIG. 3 is a customer identification and authentication diagram via said WEB interface according to one embodiment of the invention.

FIG. 3 illustrates a diagram of possible options how to identify and authenticate a customer using a WEB interface.

A transaction ID generation block 35 is connected or coupled with a Web receiving block 40.

Said receiving block 40 is connected either with ID sending blocks 50, 55 or 60 by a Web browser interface 45.

ID sending blocks 50, 55 or 60 are connected by a mobile phone interface 65 with a APC transaction data receiving block 70.

Said receiving block 70 is connected with receiving blocks 80, 85 or 90 by a mobile phone interface 72. Also, block 70 is connected with a Web receiving block 95 via a web browser interface 74.

In a first step 35, the APC generates transaction ID code.

Next, step 40 the customer receives the transaction ID code via Web browser.

Via a web interface shown by 45, the user is provided with a message (not shown) to choose an option for sending a ID code with his mobile terminal device.

Next, Customer sends as shown by 45 on his mobile terminal device, for example, by using the web browser interface the transaction ID code either through the USSD service, step 50, or customer dials the transaction ID code, step 55, or customer sends the transaction ID code with SMS, step 60.

This transaction ID code is sent from said mobile terminal device to the APC via mobile phone interface as indicated by reference sign 65.

In step 70, transaction ID code is received on a side of the APC and the customer is identified and authenticated by starting respective procedures.

Next, customer receives on his mobile terminal device a message either by the following options through the USSD service, step 80 or (and)

listens to a message during the call via IVR (Interactive Voice Response), step 85 or (and)

receives an SMS message, step 90, each by using the mobile phone interface 72 whether identification and authentification was successful or not.

Note that combinations of aforesaid steps including confirmations (not shown) are possible as well, as indicated by an "or (and)" notation.

Also, alternatively or cumulatively to the informing message that identification and authentication was successful or not, the user gets information via web browser, step 95, using the web interface 45.

Figure 4:
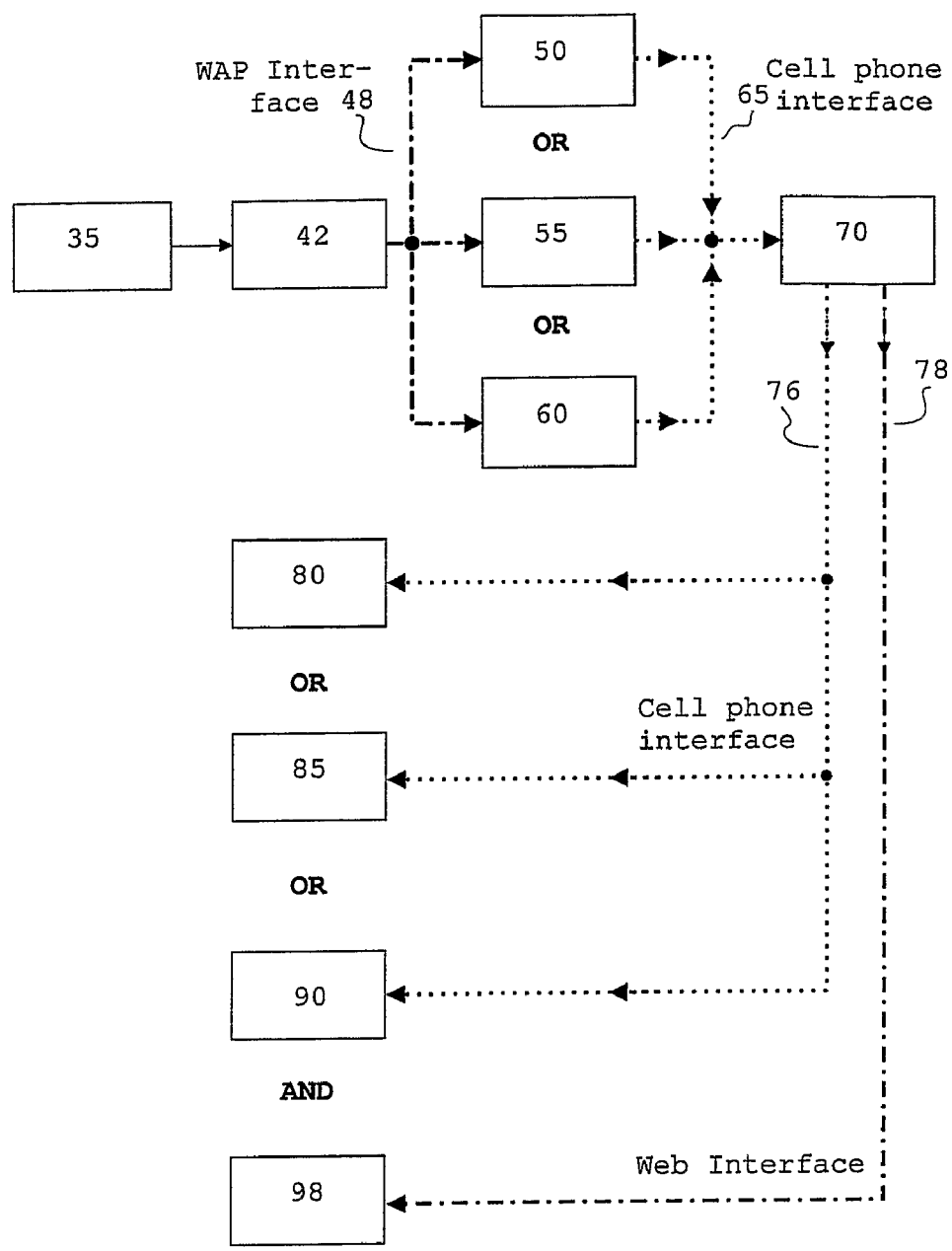
FIG. 4 is an identification and authentication diagram via said WAP interface according to another embodiment of the invention.

FIG. 4 illustrates a diagram of possible options how to identify and authenticate a customer using a WAP interface.

A transaction ID generation block 35 is connected or coupled with a WAP receiving block 42.

Said receiving block 42 is connected either with ID sending blocks 50, 55 or 60 by a WAP browser interface 48.

ID sending blocks 50, 55 or 60 are connected by a mobile phone interface 64 with a APC transaction data receiving block 70.

Said receiving block 70 is connected with receiving blocks 80, 85 or 90 by a mobile phone interface 76. Also, block 70 is connected with a WAP receiving block 98 via a WAP browser interface 78.

As shown in FIG. 4, the same user identification is presented as indicated by the same reference signs in comparison to FIG. 3.

But, instead a web browser, a WAP browser interface is used for providing the user with the transaction ID code, as depicted in step 42 using 48. Insofar, a WAP browser interface is used for informing the user in step 98 using 78.

In FIG. 4, an informing of the user can be ensured by using two different interfaces providing information to said WAP browser 48 or 78 and mobile phone interface 64 or 76. Also, each of said interfaces can be provided with the possibility of different security levels or transmission methods, etc.

Therefore, a messaging using different transmission ways combined with different transmission characteristics combined with different interfaces is possible.

Note also that, a combination (not shown) of interfaces like a Web browser, a WAP browser or a mobile phone interface is also be possible. Therefore, to use any mix of different interface standards or transmission media is provided according to requirements of a distributed application.

In functional view of FIG. 3 and FIG. 4, respectively, a customer who is connected to APC Web server 9 for making a payment via Internet will receive a transaction ID code with limited time to live.

Beside this, user will also receive via his web/WAP browser instructions how and where to send transaction ID code via his mobile device. All this will be shown to a customer on his web or WAP browser according to 40 or 42, respectively.

With the user sending procedure of transaction ID code back to APC mobile network gateway 10 via his Mobile device 3, the user MSISDN Number is captured on a side of the APC according to 70.

MSISDN Number is equipment identifier of the individual mobile radio equipment, which is also sent as an identification characteristic while the equipment is being used. Inside of invented procedure there are three possible options or ways, according to 50, 55 or 66, how a customer can sends transaction ID code to APC mobile network gateway 10. Let us suppose that the APC mobile network gateway 10 has some short digit number like for example "180", then the following scenarios are possible:

Customer sends the transaction ID code through USSD (*180* transaction_ID_code #)

Customer dials the transaction ID code with dialing prefix (180transaction_ID_code)

Customer sends the transaction ID code with SMS (sms "transaction_ID_code" to 180)

Possible transaction ID code transmissions differ from one another—first one is using the mobile operator's USSD service. Second option uses a simple dialing prefix—that means customer only dials the APC center number adding an n-digit transaction ID code number.

APC receives a call and recognizes the dialing prefix number, which is the transaction ID code number. Last option uses SMS to transfer the transaction ID code number to the APC.

When the transaction ID code is successfully transmitted to the APC the next stage is customer identification and authentication.

If this part of whole procedure is successful then the customer will receive further instructions needed for finalizing the payment through the Web/WAP browser or USSD or SMS or IVR or combination of all possible communication means shown by 80, 85 and 90 using interfaces 72, 74, 76 and 78.

In opposite case when the customer authentication is denied the customer will receive the information about this through one of possible communication channels (Web browser, WAP browser, USSD, SMS or IVR).

It is understood, that the kind of output way informing the user about his identification and authentication status (for example by USSD service, IVR, SMS, steps 80, 85 and 90, respectively) can be responsive to the kind of the selected input way according to steps 50, 55 and 60 or use a programmable default setting.

Comparing the information of the user in 40 compared to 70 in regard of the kind of browser interface used, 45 or 74 for a web browser, respectively, the possibility of different security levels or transmission methods, etc., can be provided within the same interface standard.

But also among different interface standards different levels of security an suitable coding and transmission methods are possible, in this case, a secure messaging using two different transmission ways combined with different transmission characteristics is possible.

Because payment instruments are usually protected with PIN the invented payment procedure is including also two scenarios of PIN transmission implementation.

Case 1—PIN Entered After Identification

Once the customer has finished buying in virtual shop via web/WAP browser the next step is payment. Let us suppose that the customer is registered user of mobile payment instrument protected with PIN. This case shows (FIGS. 5a to 5c) a procedure how a customer is identified using mobile phone before the actual payment. This diagram shows PIN is requested after a customer is identified.

Figure 5A:
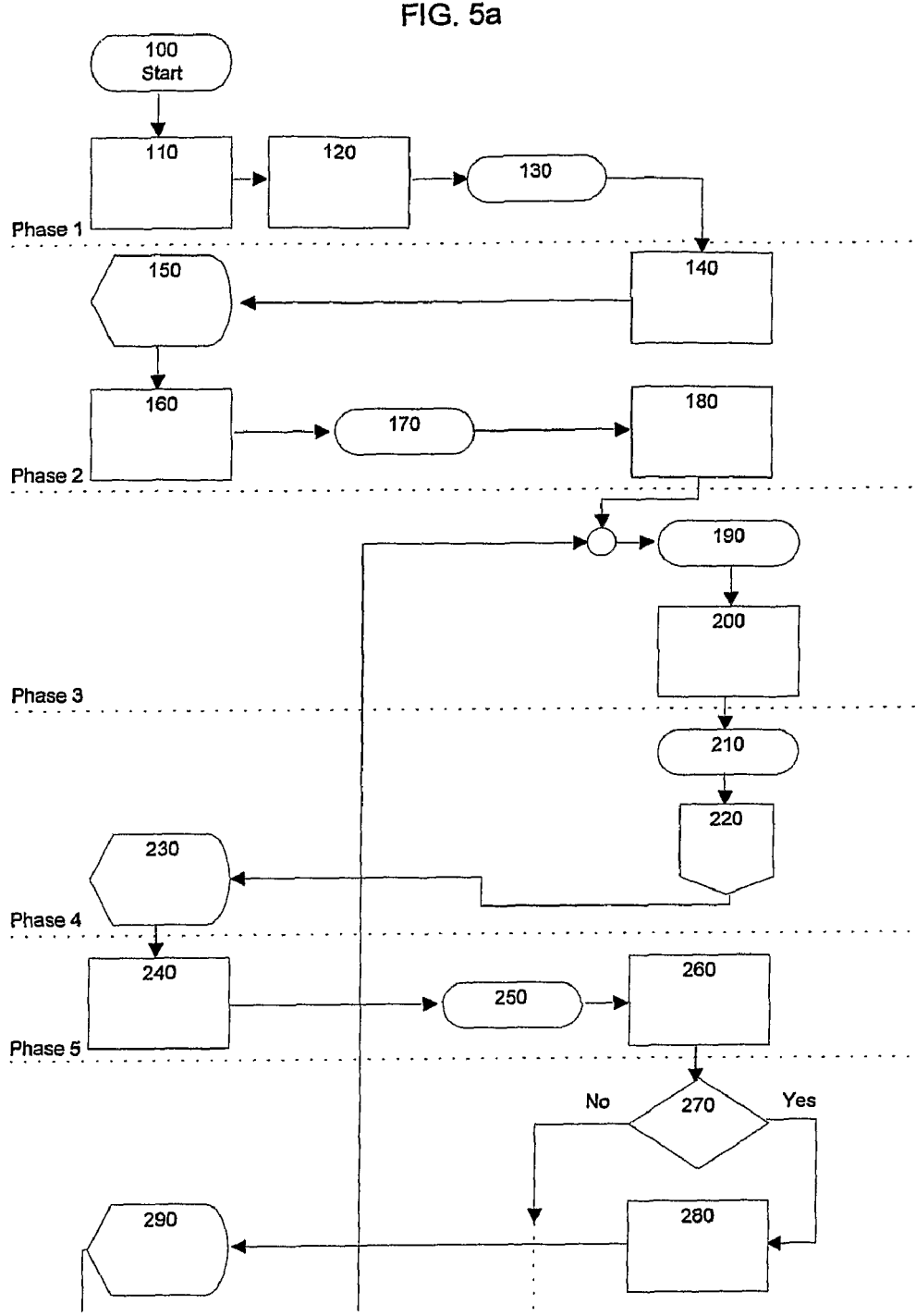

Phases Explained of FIGS. 5a to 5c, Starting with FIG. 5a:

Phase 1: Customer Selecting the Online Payment Method

Customer collects the goods in the shopping basket and proceeds to the checkout, step 110. From there he must select the payment method—the Online Payment method.

In step 120, Merchant's virtual shop then redirects the customer to the APC web page, and transfers, in step 130, the needed information about the order (which retailer, what's the bill number and cost etc.)

Phase 2—Customer Choosing the Mobile Operator

APC Web server stores the information received from the virtual shop in step 140, and asks the customer to select his mobile operator (mobile operators have different prefixes, so instructions are based on what mobile operator customer selects). The message is displayed on customer's Web or WAP browser in step 150.

Information about which mobile operator customer selected in step 160 is then transferred back to the APC Web server in step 170.

All information APC Web server gathered in step 180 is then forwarded in step 190 to the APC (number 9, 10 and 11; FIG. 1 and FIG. 2).

Phase 3—Generating the Transaction ID Code

APC generates a transaction ID code in step 200 with limited time to live, (this is how it's insured APC doesn't run out of ID codes)

In this step 200, APC looks up for the dialing code and prefix (for USSD, dialing and SMS) based on customer's mobile operator and generates the USSD cod for the customer.

Phase 4—Customer Gets the USSD Code or a Dialing Number

Code is transferred from the APC to the APC Web server in step 210, from where the instructions were generated in step 200 and then displayed to the customer (via Web or WAP browser) in step 220.

Customer has an option in step 230 not to use the default payment instruments and selects a different one (via dialing prefix or additional code).

Phase 5—Customer Sends the USSD Code or Sends the SMS (Containing the ID Code) or Dials the Number Customer then follows the instructions and sends in step 240 the transaction ID code displayed on his Web or WAP browser.

Transaction ID Code is transferred from customer's mobile phone to the APC mobile gateway in step 250 by sending a message which is received in the APC in step 260.

Phase 6—Customer Gets a Reply from the APC

APC verifies in step 270 if the transaction ID code (showed to the customer) was submitted to the APC.

No: Identification Failed

If the transaction ID code is not submitted in time (before transaction ID code expires), APC informs the mobile operator subscriber in step 300 that the ID number was not sent correctly. Customer receives a message in his Web or WAP browser, step 310 that the number wasn't sent correctly. Customer must repeat the procedure, steps 320 to 390, by entering phase 7 and thereafter returning to step 190 in phase 3.

Phase 7—Identifying of Customer Failed

In step 320, it is waited for the user until he clicks next. In step 330, a status is requested from said APC by said Web server of said APC. Next, step 340 is sending a message from said Web server of said APC to said APC for asking if the ID is okay. In step 350 the Web server of said APC is informed by said APC that the number was not send correctly. Next sending a message from said APC to said Web server of said APC is done in step 360 indicating that the ID was not received. The user is informed in step 370 that the number was not sent correctly and the user is asked by said Web server of said APC to repeat the procedure. In step 380 a message is provided to said user to be received in his WEB or WAP browser that the number was not send correctly, if the transaction ID code was not submitted in time before said transaction ID code expired. It is then waited until the user is clicking next in step 390. The procedure is repeated by the user by going to phase 3, step 190 (FIG. 5a).

Yes: Identification Succeeded—go to Phase 9

If the transaction ID code was submitted to the APC, the Mobile Subscriber is matched with the online customer. In step 280 the APC informs the mobile operator subscriber that the ID number was sent correctly. Customer receives a message that identification was successful, step 290, proceed to step 400 in phase 8 (FIG. 5b).

Phase 8—Status Requested the APC checks the status of the ID in steps 410 to 430.

In detail, in step 400 it is waited on the user clicking next and the user is matched as a mobile subscriber with the online user. Next, a status from said APC by said Web server of said APC is requested in step 410. A message is send in step 420 from said Web server of said APc to said APC to ask if the ID is okay. In step 430 control is proceeding after said identification was successful by said APC and asking the user to enter his PIN for the selected account.

Phase 9—PIN is Requested from the Customer

APC asks the customer to enter his chosen Payment instrument's PIN in step 435. Customer enters the PIN in his Web or WAP browser, in step 440 which is send to the APC in step 450.

In detail requesting a Personal Identification Number from the user is done in step 430. Next, asking the user to enter the Personal Identification Number of his chosen payment instrument is performed in step 435. In step 440, the PIN is entered by the user in his Web or WAP browser. In step 450, a message is sent from the mobile terminal device to said Web Server of said APC to transfer said Personal Identification Number. In step 460, the PIN is received from said user by the Web server of the APC and it is transferred to said APC. In step 470, a message is send from Web Server of said APC to said APC for transferring said PIN. Proceeding and checking the defrayal of necessary costs of the payment instrument of said user by said authorization and processing center is done in step 475.

Phase 10—PIN is Checked.

If the PIN is ok, go to phase 11, step 560; If not ok, go to phase 9, step 440;

PIN is then being either verified directly on APC or transferred from the APC to the Financial Institution In case that PIN was send to Financial Institution in step 480 then the PIN and other information are checked in step 500 if they are valid If the PIN was invalid, the information is sent to the APC in step 510. APC informs in step 540 the customer about the incorrect PIN and asks the customer to enter his PIN correctly, step 550.

If the PIN is valid, Financial Institution checks the customer's balance in phase 11, step 560.

In detail (phase 10), a message is sent from said APC to said financial institution for transferring transaction data, including account number, Personal Identification Number and cost in step 480. Receiving by said financial institution said transaction data is done in step 490. In step 500 checking is done, if the Personal Identification Number correct by said financial institution.

If the PIN is okay (yes) processing proceeds to phase 11, step 560. If not (no), an error message is sent in step 510 from said financial institution to said APC that said PIN is incorrect. In step 520 said error message is transferred or forwarded from said APC to said Web server of said APC.

In step 530 an error message is sent from said APC to said Web server of said APC informing that said Personal Identification Number is incorrect. Receiving said error message and informing the user is about the incorrect PIN by said Web server of said APC done in step 540. In step 550, a request is issued to the user to re-enter the Personal Identification Number. In step 550 a message is displayed to the user that the PIN which he has entered is incorrect. In this step 550 the user is also asked to re-enter his PIN. From step 550 processing returns to phase 9, step 440 (FIG. 5*a*).

Phase 11—Customer's Account Balance is Checked in Step 560. In an Overview, if the Balance is Low, Customer can Repeat the Procedure Choosing Another Type of Payment, go to Phase 1

If balance is low, information is sent to the APC. APC informs the customer about his account balance status, and asks him to choose other type of payment.

If balance is valid, information is sent to the APC in step 650. In detail, in step 560 it is checked if the account balance is sufficient for defrayal by the financial institution. In case of "no" (account is not sufficient), an error message is sent from the financial institution to the APC to inform and indicate that account balance is insufficient for defrayal. In step 580, APC transfers said error message from said APC to said Web server of said APC. In step 590 an error message is sent from said APC to said Web server of said APC informing that account balance is insufficient for defrayal. In Step 600, said error message is received by said Web server of said authorization and processing center about the account balance status and the user is informed. In step 610, the error message is displayed to the user. Also in step 610, an option to choose another type of payment (payment instrument) is displayed to the user. Possibly, the customer may have an account which has a balance sufficient for the transaction. Next, in step 620, the choice of the user is checked. If the user has chosen to cancel the payment, the processing ends in step 630. If the user chooses another type of payment in step 640, control returns to phase 1 in step 100 by jumping to the start. In case of "yes" (sufficient account) processing jumps into phase 12 to continue with step 650.

phase 12—Payment Confirmed by the Customer

In short, APC asks the customer to confirm the order in step 680. Customer confirms the payment, in step 700. First a message is sent in step 650 from the financial institution to the APC for informing that the account balance is sufficient for defrayal. Next, said message is sent in step 660 from said APC to said Web server of said APC. In Step 670, a message is sent from said APC to said Web server of said APC for informing that the account balance is sufficient for defrayal. Receiving said message and asking said user to confirm his payment is done in step 680 by said Web server of said authorization and processing center. In step 690 it is waited for confirming the payment by the user. Finally, the payment process is exit on confirmation of said user in step 700.

Case 2—PIN Entered Before Identification

This case shows (FIGS. 6*a* to 6*c*) a procedure how a customer is identified using mobile phone before the actual payment. This diagram shows PIN is requested before a customer is identified. Therein, the phases 9 and 10 of FIGS. 5*b* and 5*c* are differing in that proceeding continues from phase 8, last step (430) to phase 10, first step (480).

Phase 10—Pin Checking a message is sent in step 480 from said authorization and processing center to said financial institution for transferring transaction data, including account number, Personal Identification Number and cost;

said transaction data is received by said financial institution in step 490 and checked in step 500, if the Personal Identification Number correct;

if it is okay (yes) the processing proceeds to phase 11 step 560, else an error message is sent in step 510 from said financial institution to said APC that said PIN (Personal Identification Number) is incorrect. The error message is forwarded in step 520 from said APC to said APC Web server.

Next in step 530 an error message is sent from said APC to said APC Web server that said PIN is incorrect.

In step 540 the APC Web server receives the error message and informs the user about the incorrect PIN.

A request is issued in step 550 to the user to re-enter the PIN.

Next, in step 550, a message is displayed to the user that the Personal Identification Number he has entered was incorrect and he is asked to re-enter his PIN, The processing returns to phase 9, step 440.

Phase 9—Pin Request

In step 440, the user enters a PIN in his Web or WAP browser.

Next, a message is sent in step 450 from the mobile terminal device to said Web Server of said APC to transfer said Personal Identification Number.

Web server of APC receives in step 460 the PIN from the user and transfers it to the APC.

In step 470 a message is send from the APC Web Server to said APC to transfer said PIN;

processing continues in phase 8, last step 430.

The invention claimed is:

1. A method for operating a mobile terminal device in a user identification and authentication payment procedure comprising:

in step 1:

selecting an online payment method by a user during a payment at a checkout;

redirecting the user to a WEB page of an authorization and processing center by a merchant of a virtual WEB shop;

sending information from a virtual WEB shop to said authorization and processing center, wherein said information includes a name of a retailer, a bill number, and a cost;

in step 2:

storing the information and asking the user to select a mobile operator;

providing a message which is displayed on a WEB or wireless access point (WAP) browser;

selecting a mobile operator by said user and waiting until the user click next;

sending a message from said mobile terminal device to a WEB server of said authorization and processing center regarding which mobile operator was selected by the user;

forwarding all information gathered by the WEB server of said authorization and processing center to all subsystems of the authorization and processing center;

in step 3:

sending a message for providing information ready for input, including said selected mobile operator, a name of the WEB shop site, said bill number and said cost generating a transaction ID code with a predetermined time set forth by said authorization and processing center by using said information; looking up for the dialing code and prefix by said authorization and processing center, based on the mobile operator of the user; generating a Unstructured Supplementary Service Data code for said user;

in step 4:
sending a message from said authorization and processing center to said WEB server of said authorization and processing center for providing an Unstructured Supplementary Service code or a dialing number to the user;
displaying the Unstructured Supplementary Service code or the dialing number and a plurality of payment instruments to the user by the WEB server of said authorization and processing center;
providing an option to the user not to use default payment instruments and an option to select a different payment instrument from a plurality of payment instruments;

in step 5:
entering a requested information which is displayed on the WEB or WAP page by said user on the mobile terminal device by following instructions;
sending a message for transferring said transaction ID code to a mobile network gateway of said authorization and processing center;
receiving a request from said user including the transaction ID code and an optional payment instrument number;

in step 6:
verifying whether the transaction ID code was submitted to said authorization and processing center;
when the transaction ID code is sent correctly and on time:
informing the mobile operator by said authorization and processing center that the transaction ID code was sent correctly;
informing the user that an identification was successful; and
requesting the user to proceed inputing information by following instructions;
when the transaction ID code is not sent correctly and on time:
informing the mobile operator by said authorization and processing center that the transaction ID code was not send correctly;
informing the user that the transaction ID code entered was invalid; and
requesting the user to proceed inputing information following instructions;

in step 7:
when identification fails by the time the user clicks next:
requesting a status from said authorization and processing center by said WEB server of said authorization and processing center;
sending a message from said WEB server to said authorization and processing center for determining the transaction ID code is correct;
informing the WEB server of said authorization and processing center by said authorization and processing center that the transaction ID code was not sent correctly;

sending a message from said authorization and processing center to said WEB server of said authorization and processing center that the transaction ID code was not received; and
informing the user that the transaction ID code was not sent correctly and asking the user to repeat a procedure by said WEB server of said authorization and processing center;
when the transaction ID code is not submitted before the transaction ID code expires:
providing a message to said user in the WEB or WAP browser that the transaction ID code was not sent correctly,
waiting until the user clicks next; and
repeating the procedure by the user by going to step 3;

in step 8:
waiting until the user clicks next and matching the user as a mobile subscriber with the online user;
requesting a status from said authorization and processing center by said WEB server of said authorization and processing center;
sending a message from said WEB server of said authorization and processing center to said authorization and processing center for asking the transaction ID code is correct;
proceeding after said identification is successful by said authorization and processing center; and
asking the user to enter a Personal Identification Number for a selected account;

in step 9:
requesting the Personal Identification Number from the user;
asking the user to enter the Personal Identification Number of the selected payment instrument;
entering the Personal Identification Number by the user in his WEB or WAP browser;
sending a message from the mobile terminal device to said WEB Server of said authorization and processing center for transferring said Personal Identification Number;
receiving the Personal Identification Number from said user by the WEB server of the authorization an processing center and transferring the Personal Identification Number to said authorization and processing center;
sending a message from WEB Server of said authorization and processing center to said authorization and processing center for transferring said Personal Identification Number; and
proceeding and checking a defrayal of costs of the selected payment instrument of said user by said authorization and processing center;

in step 10:
sending a message from said authorization and processing center to a financial institution for transferring transaction data, including an account number, Personal Identification Number and cost;
receiving by said financial institution said transaction data and determining whether the Personal Identification Number is correct;
when the Personal Identification Number is correct: proceeding to step 11,
when the Personal Identification Number is not correct:

sending an error message from said financial institution to said authorization and processing center that said Personal Identification Number is incorrect;

transferring said error message from said authorization and processing center to said WEB server of said authorization and processing center;

sending an error message from said authorization and processing center to said WEB server of said authorization and processing center that said Personal Identification Number is incorrect;

receiving said error message and informing the user that the Personal Identification Number by said WEB server of said authorization and processing center is incorrect;

issuing a request to the user to re-enter the Personal Identification Number;

displaying a message to the user that the Personal Identification Number entered is incorrect;

asking the user to re-enter the Personal Identification Number; and returning to step 9 by asking the user to enter the Personal Identification Number of the selected payment instrument;

in step 11:

determining whether an account balance is sufficient for defrayal;

when the account balance is sufficient proceeding to step 12;

when the account balance is not sufficient:

sending the error message from the financial institution to the authorization and processing center for informing that the account balance is insufficient for defrayal;

transferring said error message from said authorization and processing center to said WEB server of said authorization and processing center;

sending said error message from said authorization and processing center to said WEB server of said authorization and processing center that the account balance is insufficient for defrayal;

receiving said error message from the financial institution and informing said user about the account balance status by said WEB server of said authorization and processing center;

displaying to said user said error message from the financial institution;

displaying to said user an option to choose another type of payment and an option to cancel the payment; and determining the choice of the user;

when the user has chosen to cancel the payment, ending the payment procedure; and when the user has not chosen to cancel the payment and selected another type of payment, returning to step 1;

in step 12:

sending a message from the financial institution to the authorization an processing center for informing that the account balance is sufficient for defrayal;

transferring said message from said authorization and processing center to said WEB server of said authorization and processing center;

sending a message from said authorization an processing center to said WEB server of said authorization and processing center for informing that the account balance is sufficient for defrayal;

receiving said message by the WEB server and asking said user to confirm his payment by said WEB server of said authorization and processing center;

waiting until receiving a confirmation of the payment by the user; and exiting the payment process upon the confirmation of the payment by the user.

* * * * *